UNITED STATES PATENT OFFICE.

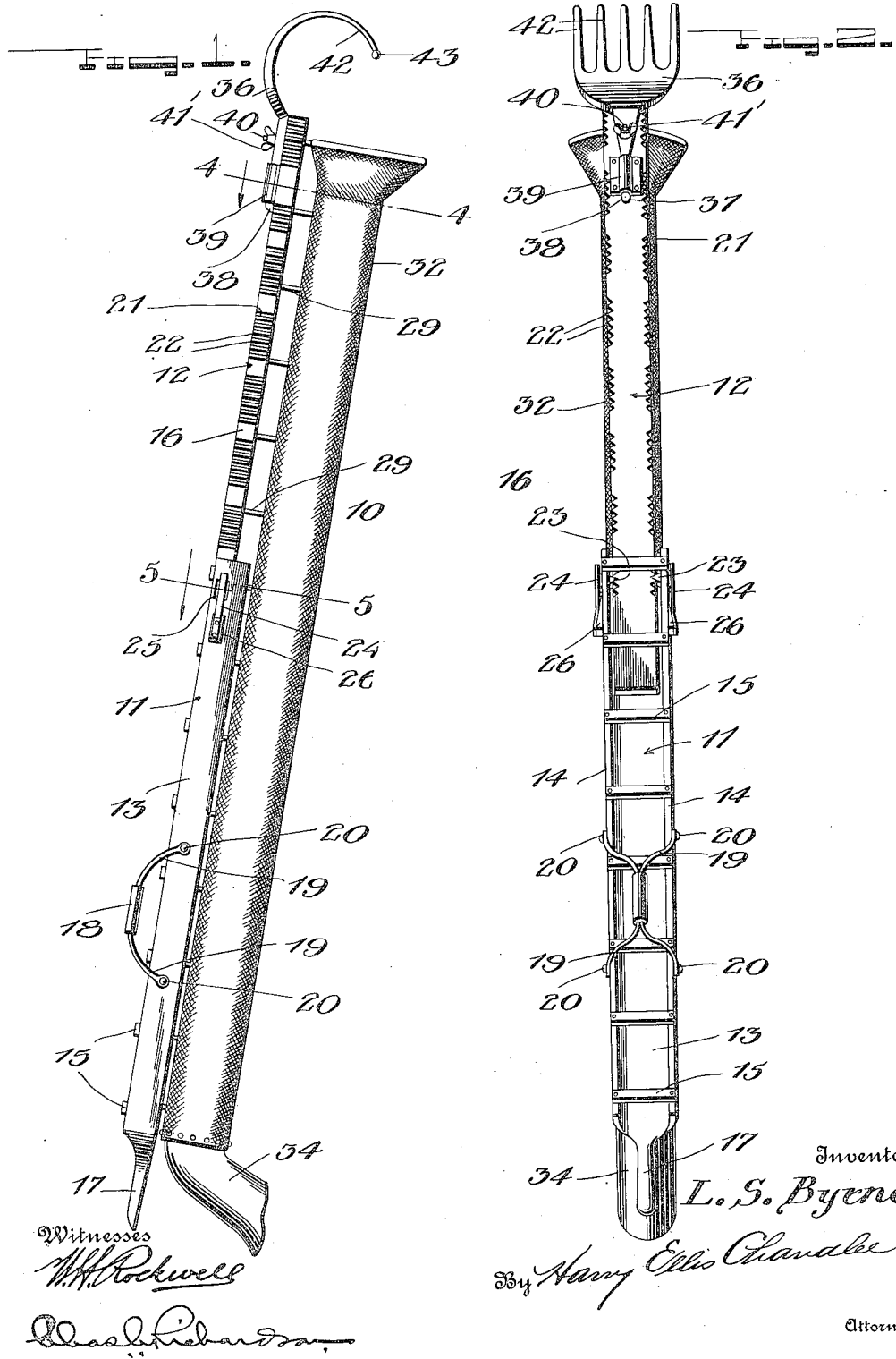

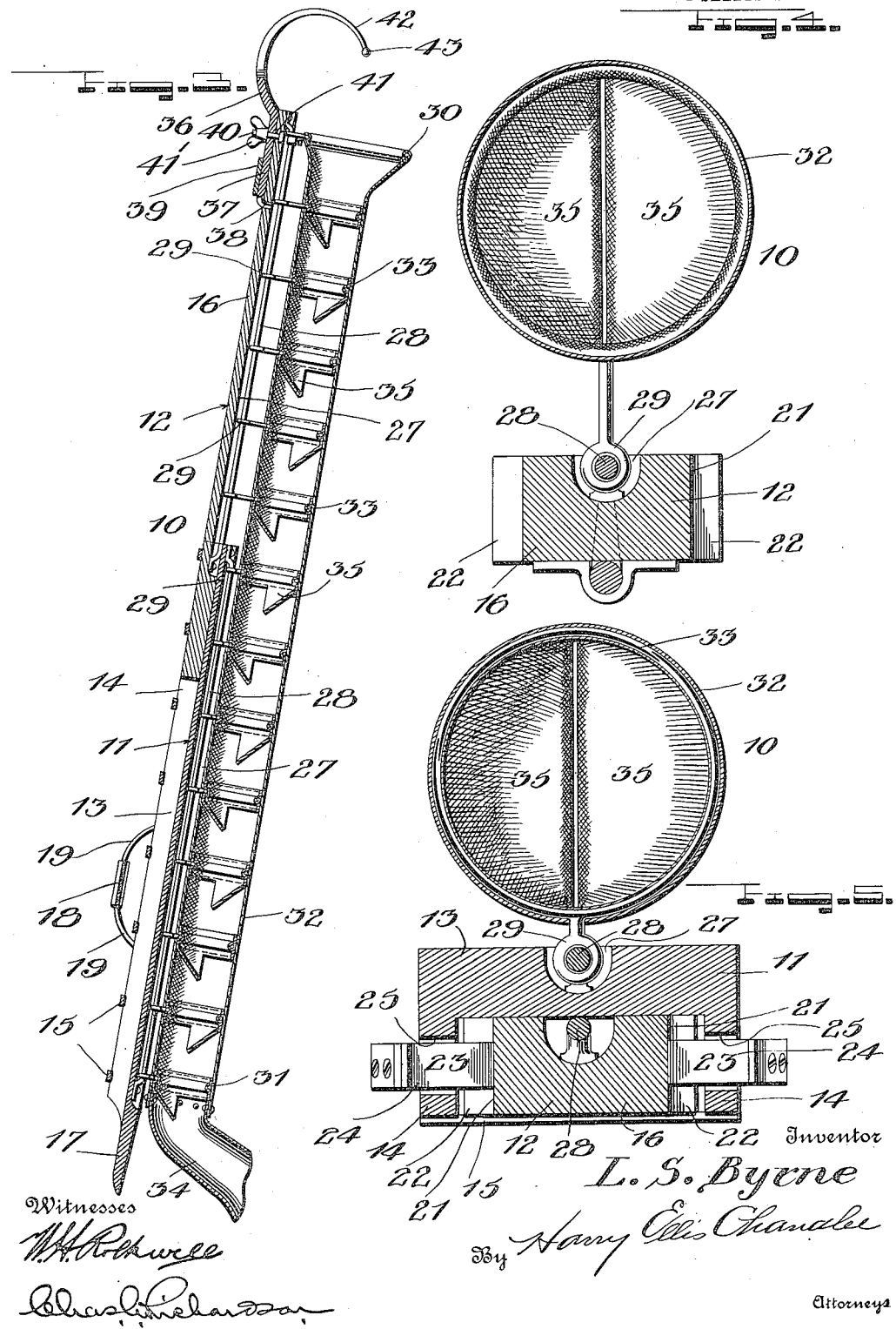

LUVERNE STEPHEN BYRNE, OF PITTSBURGH, PENNSYLVANIA.

FRUIT-PICKER.

1,069,849.                    Specification of Letters Patent.    Patented Aug. 12, 1913.

Application filed January 12, 1912.   Serial No. 670,890.

*To all whom it may concern:*

Be it known that I, LUVERNE S. BYRNE, a citizen of the United States, residing at Pittsburgh, in the county of Allegheny and State of Pennsylvania, have invented certain new and useful Improvements in Fruit-Pickers, of which the following is a specification.

This invention relates to new and useful improvements in fruit pickers.

An object of this invention is the provision of a fruit picker which is so constructed that a person may use the same to remove fruit or the like from any position upon a tree without necessitating his climbing the same.

Another object of this invention is the provision of a fruit picker which may be adjusted to reach the fruit or the like upon any portion of a tree for the purpose of removing the same without causing any injury thereto.

A further object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings in which:—

Figure 1 is a side elevation of my improved fruit picker. Fig. 2 is a rear elevation thereof. Fig. 3 is a longitudinal sectional view therethrough. Fig. 4 is a transverse sectional view taken on the line 4—4 of Fig. 1, and Fig. 5 is a similar view taken on the line 5—5 of Fig. 1.

Referring to the accompanying drawings by similar characters of reference throughout the several views, the numeral 10 designates generally my improved fruit picker, which comprises a pair of sliding sections 11 and 12. The section 11 comprises a rectangular shaped bar 13 which is formed upon one side with a pair of spaced ribs 14 connected at their outer edges by retaining strips 15 beneath which is slidably located the section 12 which comprises a rectangular bar 16, the opposite edges of which engage the inner sides of the ribs 14. The lower end of the bar 13 is shaped to produce a handle 17, while secured to the intermediate portion of the said bar 13 is a handle 18, the opposite ends of which are bifurcated as at 19 and off-set laterally to extend upon the opposite sides of the ribs 14 to which they are rigidly secured as indicated by the numeral 20. The handles 17 and 18 serve to permit the operator of the fruit picker to move the same to any desired position or at any desired angle. The side edges of the bar are provided with spaced series of teeth 22 the terminals of which lie flush with the side edges of the bar for engagement with the teeth 23 which are supported by spring pawls 24 secured to the outer sides of the ribs 14, the said teeth 23 operating through slots 25 formed in the said ribs 14. Obviously when the teeth 23 are removed from their engagement with the teeth 22, the bar 16 may be slid between the ribs 14 relative to the bar 13, while the engagement of the said teeth will hold the bars in their relative adjusted positions against any undesired displacement. In order to assure the engagement between the teeth 22 and 23 tapered lugs 26 are secured to the outer sides of the ribs 14 and to these lugs are secured the stationary extremities of the spring pawls 24. When the teeth 23 are in engagement with the teeth 22 it should be noted that the free terminals of the pawls 24 are held slightly spaced from the adjacent sides of the ribs 14 whereby a finger grip is produced by means of which the pawls may be moved so as to disengage the teeth 22 and 23. The under sides of the bars 13 and 16 are formed with longitudinally extending grooves 27 in which are located in spaced relation therefrom supporting rods 28 upon which are slidably located a plurality of eyes 29.

Rings 30 and 31 are secured to the opposite ends of the sections 11 and 12 and have secured thereto the opposite ends of a tube 32 formed from any desired flexible material such as canvas or the like. This tube 32 is reinforced at intervals throughout its length by a series of circular ribs 33 which are connected to the before mentioned eyes 29. The lower end of the tube 32 is provided with an off-set extension 34 preferably of material of a non-flexible nature which is adapted to be secured to a bag or other container (not shown in the drawings) for the purpose of receiving the articles which pass through the said tube 32.

A series of baffle plates 35 formed from a material similar to that from which the tube 32 is constructed are arranged within the said tube 32 for the purpose of obstructing the passage of articles therethrough, thereby retarding their movement and preventing injury thereto caused by forcibly entering the container (not shown) through the off-set extension 34.

A head 36 is secured to the upper end of the bar 16 and is formed with a shank 37 offset as at 38 to engage an opening formed in said bar 16. This offset 38 is secured against displacement from the opening and also against any other desired movement by a guide plate 39 secured over the shank and also by a locking screw 40 which extends through alining apertures 41 formed in the bar 16 and shank 37 and provided with the usual winged nut 41'.

A plurality of fingers 42 are formed upon the upper side portions of the head 36 and extend beyond the adjacent end of the bar 16 for a suitable distance at which points they are curved outwardly over a ring 31 to which the tube 32 is secured and are terminally equipped with knobs 43 which prevents injury to the fruit caused by its engagement with the said terminals of the fingers 42.

The device is used as follows:—The sections 11 and 12 are adjusted to the desired position for permitting the operator to reach the fruit to be picked. The fruit is then caught between the fingers 42 and the device as a whole pulled or twisted to remove the fruit from the tree. The fruit will then pass through the tube 32 and offset extension 34 into a suitable receptacle. It will be noted that the baffle plates 35 are arranged a sufficient distance apart to permit of the desired contraction of the tube 32 without interference with the passage of the fruit through the tube.

When it is desired to retain the picker in its operative position while the fruit is being removed from the container or for any other reason, the fingers 42 may be extended from a limb of the tree which obviously retains the picker in its raised or operative position. It should be understood in this connection that various minor changes in the details of construction may be resorted to within the scope of the appended claims without departing from or sacrificing any of the advantages of the invention.

From the foregoing disclosures taken in connection with the accompanying drawings it will be manifest that a fruit picker of the nature described is provided for which will fulfil all of the necessary requirements of such a device.

Having thus fully described this invention what I claim as new and desire to protect by Letters Patent, is:—

1. The combination in a fruit picker, of a pair of slidably connected bars, means for holding the bars in adjusted relation, means for severing the fruit mounted on the outer end of one of said bars, longitudinal rods supported by said bars respectively, rings slidable on said rod, and a tubular member mounted on said rings.

2. The combination in a fruit picker, of a pair of sections one of which is provided with a groove receiving the other section and the side walls of said groove being provided with slots, teeth formed on the walls of the non-grooved section, blocks mounted on the sides of the grooved sections, pawls mounted on said blocks respectively and engaging said teeth through the slot, said blocks serving to hold the stems of said pawls in spaced relation to the sides of the grooved section, and a fruit picking and conveying means carried by the section.

In testimony whereof I affix my signature, in the presence of two witnesses.

LUVERNE STEPHEN BYRNE.

Witnesses:
S. O. NEWHOUSE,
Mrs. S. O. NEWHOUSE.